(No Model.)
R. G. STANBROUGH.
DENTAL TOOL.
No. 468,923.  Patented Feb. 16, 1892.
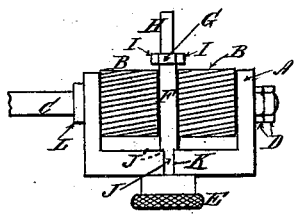
Fig. 1.
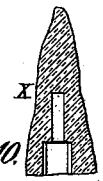
Fig. 10.
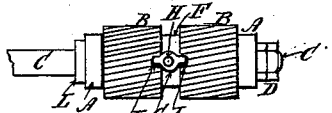
Fig. 2.
Fig. 9.
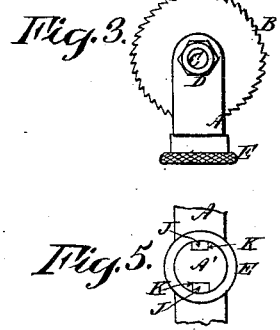
Fig. 3.
Fig. 5.
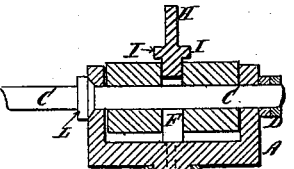
Fig. 4.
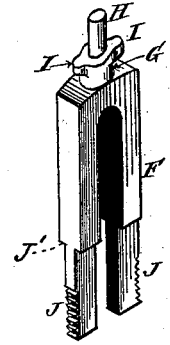
Fig. 6.
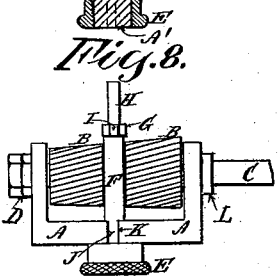
Fig. 8.
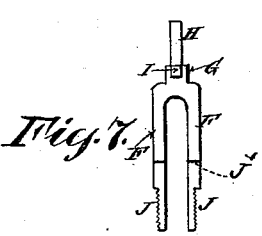
Fig. 7.
Witnesses:
D. W. Gardner
Curtis Lammond
Inventor:
Rufus G. Stanbrough
By Ernest C. Webb
Atty.
THE NORRIS PETERS CO., PHOTO-LITHO., WASHINGTON, D. C.

UNITED STATES PATENT OFFICE.

RUFUS G. STANBROUGH, OF NEW YORK, N. Y., ASSIGNOR TO ROBERT SEAMAN, OF SAME PLACE.

DENTAL TOOL.

SPECIFICATION forming part of Letters Patent No. 468,923, dated February 16, 1892.

Application filed December 9, 1891. Serial No. 414,514. (No model.)

*To all whom it may concern:*

Be it known that I, RUFUS G. STANBROUGH, a citizen of the United States, and a resident of New York, in the county of New York and State of New York, have invented certain new and useful Improvements in Cutting-Tools, of which the following is a specification.

This invention relates to an improved form of burring or cutting mechanism for dental operations; and the invention has for its object the adjustment of the burrs or cutters in such manner that the free ends or roots of teeth can be accurately shaped to receive an artificial denture—such, for instance, as what is known in the art as an "artificial cap or crown." As heretofore practiced this operation has ordinarily been performed by hand with a variety of tools, and it has been found almost impossible by this means to form a precise and accurate groove either in size or direction.

By my invention I seek to adjust and hold the burrs or cutters mechanically, so that the free end of the root will be accurately shaped to receive the desired crown or cap.

To this end my invention consists, principally, in a peculiarly-shaped device, which I term a "guide or holder," supported on the frame of the cutting-tool and arranged to enter and adjust itself in a cavity formed in the root end, whereby as the burrs or cutters operate they will be firmly held and continuously bear in a given direction, thus mechanically giving the root end the desired shape precisely and accurately.

The invention also includes the details of construction and arrangement as hereinafter more fully described.

In the accompanying drawings, forming part of this specification, in the several figures of which like parts are designated by similar letters of reference, Figure 1 is a side view, Fig. 2 a top plan view, Fig. 3 an end view, and Fig. 4 a longitudinal section, of my improved burring or cutting tool. Figs. 5, 6, and 7 are details of the same. Figs. 8 and 9 represent modifications.

A designates the frame of the machine, within which burrs or cutters B B are removably secured to and arranged to rotate upon a shaft C in any suitable manner. This shaft is held in the frame by lock-nuts D D and is provided with a collar L to prevent longitudinal motion. The shaft C can be rotated by means of any suitable power and through the medium of appropriate power-transmitting mechanism. The frame A is provided at its lower side and centrally thereof with an extension A'. The lower portion of the frame and its extension has formed thereon two square grooves K K, into which the legs J J of a bifurcated frame F set. This frame F straddles the shaft C, and the lower portions of the legs J J are made square, so as to fit snugly in the grooves K K. These lower portions J J are also reduced in diameter so as to form shoulders J' J', which when the frame F is set in position, as shown in Fig. 1, abut against the top of the lower portion of the frame A. The lower portions of the legs J J are screw-threaded, and when the frame F is set in the position shown in Fig. 1 it straddles the shaft C and the legs J J separate the burrs or cutters B B, the lower portions of the legs J J entering the square grooves K K and being firmly and rigidly held thereon by means of the thumb-nut E, which is screwed onto the extension A' and over the lower portions of the legs J J. In this position of the parts it will be observed that the burrs or cutters B B are positively separated from each other, and yet at the same time are free to rotate with the shaft C. The upper end of this bifurcated frame F is provided with a projecting pin H, which may be of any desired length and diameter, and at the base of this pin H, I provide a templet, which consists of a circular central portion G, provided with two diametrically-opposite lugs or ears I I, of semicircular shape. This templet constitutes a guide or holder for the burring or cutting mechanism, whereby such mechanism automatically adjusts itself and operates to form the root end to the desired shape.

This will more fully appear from the operations of the machine, which I will now proceed to describe. I first form in the root of the tooth by any suitable means a hole or cavity of the exact shape and contour of the pin and an enlarged hole or cavity capable of receiving the templet and its lugs I I. This last cavity is formed in the root end in the direction in which it is desired to shape the root end to receive the artificial cap or crown. Care must be taken to make this last-mentioned cavity of a dimension into which the lugs I I of the templet will accurately fit. When this has been accomplished, the burrs or cutters are set in motion and by means of the templet, which acts as a guide, are kept truly in a given direction until the cutting operation is finished. In this way any certain desired form or shape may be given to the free end of the root and any number of individual roots may all be shaped accurately and exactly alike. It will be observed that the burrs B B are removable and others of varying diameter may be substituted, when desirable. (See, for instance, Fig. 9.) The burrs may also be made conical or tapering, as shown in Fig. 8. It will also be observed that the bifurcated frame F is also removable, and a similar bifurcated frame may be substituted in its place, having, for instance, a templet with its lugs or ears arranged at a different angle, so that the burrs will be guided to cut or shape the root end in any desired direction.

What I claim as my invention, and desire to secure by Letters Patent, is—

1. In a cutting-tool and frame, a shaft supported in said frame and burrs or cutters carried by and rotating with said shaft, in combination with a bifurcated frame straddling said shaft, separating said burrs, and carrying at its upper end a pin and templet to guide the burring or cutting mechanism, whereby it will be held to continuously bear in a given direction, substantially as and for the purpose described.

2. In a cutting-tool for dental operations, the combination, with burrs or cutters suitably arranged to rotate in a frame, of a supporting device locked to said frame and carrying at its upper end a guiding device for holding the burrs or cutters rigidly to operate in a given direction, substantially as described.

3. The frame A, having an extension A' and grooves K, in combination with the bifurcate F and thumb-nut E, substantially as and for the purpose described.

4. The combination, with burring or cutting mechanism substantially such as described, of a guiding device comprising a pin, a templet arranged at the base of said pin, consisting of a circular central portion terminating at each end in a semicircular lug supported upon a bifurcated frame arranged to straddle the shaft between the burrs or cutters and to be removably locked in place upon the main frame of the machine, as set forth.

5. In a dental machine, burrs or cutters removably set on a shaft and separated from each other by means of a bifurcated frame secured to a suitable holding-frame and carrying at its upper end a guiding device whereby said burrs or cutters will be held to continuously bear in a given direction, substantially as set forth, for the purpose described.

Signed at New York, in the county of New York and State of New York, this 22d day of December, A. D. 1890.

RUFUS G. STANBROUGH.

Witnesses:
E. R. KNOWLES,
E. IRVING CARR.